United States Patent
Aggarwal et al.

(10) Patent No.: US 12,061,571 B2
(45) Date of Patent: *Aug. 13, 2024

(54) LINEAGE DATA FOR DATA RECORDS

(71) Applicant: American Express Travel Related Services Company, Inc., New York, NY (US)

(72) Inventors: Ambika Aggarwal, Jersey City, NJ (US); Ravi Arasan, Basking Ridge, NJ (US); Sandeep Bose, Scottsdale, AZ (US); Debasish Das, New York, NY (US); Ravi K. Kaushik, New York, NY (US); Matthew Kent Meyer, Brooklyn, NY (US); Gurusamy Ramasamy, Princeton, NJ (US); Jeremy D. Seideman, Brooklyn, NY (US)

(73) Assignee: American Express Travel Related Services Company, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/313,142

(22) Filed: May 5, 2023

(65) Prior Publication Data

US 2023/0273898 A1 Aug. 31, 2023

Related U.S. Application Data

(63) Continuation of application No. 17/519,776, filed on Nov. 5, 2021, now Pat. No. 11,681,651, which is a
(Continued)

(51) Int. Cl.
*G06F 16/11* (2019.01)
*G06F 16/2458* (2019.01)

(52) U.S. Cl.
CPC ........ *G06F 16/116* (2019.01); *G06F 16/2471* (2019.01)

(58) Field of Classification Search
None
See application file for complete search history.

(56) References Cited

U.S. PATENT DOCUMENTS 5,226,079 A 7/1993 Holloway
5,974,396 A 10/1999 Anderson et al.
(Continued)

*Primary Examiner* — Wilson Lee
(74) *Attorney, Agent, or Firm* — Thomas | Horstemeyer, LLP

(57) ABSTRACT

Systems and methods of the present disclosure may read source data corresponding to a source variable and apply a transformation to the source variable to generate an output variable. Accordingly, one such method comprises receiving a request to access an output variable by applying one or more data transformations to input data; before applying an actual data transformation to the input data, identifying that a match exists with a database of prior data transformations that have been applied to source variables to generate derived variables; identifying that a source variable in the matching one or more data transformations is flagged as sensitive data; and processing the request to access the output variable subject to an access restriction in response to the identification of the source variable that is flagged as sensitive data.

20 Claims, 5 Drawing Sheets

Related U.S. Application Data continuation of application No. 16/036,326, filed on Jul. 16, 2018, now Pat. No. 11,169,959, which is a continuation of application No. 14/944,849, filed on Nov. 18, 2015, now Pat. No. 10,037,329.

(56) References Cited

U.S. PATENT DOCUMENTS

| | | |
|---|---|---|
| 6,427,151 B1 | 7/2002 | Chan et al. |
| 6,820,168 B2 | 11/2004 | Tanaka et al. |
| 7,062,510 B1 | 6/2006 | Eldering |
| 7,376,618 B1 | 5/2008 | Anderson et al. |
| 7,690,564 B2 | 4/2010 | Rane |
| 7,853,469 B2 | 12/2010 | Maitland et al. |
| 8,090,402 B1 | 1/2012 | Fujisaki |
| 8,429,068 B1 | 4/2013 | Fasoli et al. |
| 8,572,679 B1 | 10/2013 | Wang et al. |
| 8,660,945 B1 | 2/2014 | Pariante et al. |
| 9,092,502 B1 | 7/2015 | Cannaliato et al. |
| 9,176,966 B2 | 11/2015 | Silverstein et al. |
| 9,542,688 B2 | 1/2017 | Bernard et al. |
| 9,584,517 B1 | 2/2017 | Roth et al. |
| 9,785,953 B2 | 10/2017 | Desal et al. |
| 9,921,072 B2 | 3/2018 | Spears et al. |
| 9,947,020 B2 | 4/2018 | Fordyce, III et al. |
| 9,998,477 B2 | 6/2018 | Kaiho |
| 10,037,329 B2 * | 7/2018 | Aggarwal ............. G06F 16/116 |
| 10,055,426 B2 | 8/2018 | Arasan et al. |
| 10,055,471 B2 | 8/2018 | Aggarwal et al. |
| 10,152,754 B2 | 12/2018 | Marshall et al. |
| 10,169,601 B2 | 1/2019 | Arasan et al. |
| 10,360,394 B2 | 7/2019 | Arasan et al. |
| 10,445,324 B2 | 10/2019 | Arasan et al. |
| 11,169,959 B2 * | 11/2021 | Aggarwal ............. G06F 16/116 |
| 11,681,651 B1 * | 6/2023 | Aggarwal ........... G06F 16/2471 707/756 |
| 2001/0027413 A1 | 10/2001 | Bhutta |
| 2002/0023215 A1 | 2/2002 | Wang et al. |
| 2003/0028529 A1 | 2/2003 | Cheung et al. |
| 2003/0187821 A1 | 10/2003 | Cotton et al. |
| 2004/0028227 A1 | 2/2004 | Yu |
| 2005/0027723 A1 | 2/2005 | Jones et al. |
| 2005/0049924 A1 | 3/2005 | Debettencourt et al. |
| 2005/0144451 A1 | 6/2005 | Voice et al. |
| 2005/0149761 A1 | 7/2005 | Chiviendacz et al. |
| 2005/0197954 A1 | 9/2005 | Maitland et al. |
| 2006/0195449 A1 | 8/2006 | Hunter et al. |
| 2006/0282864 A1 | 12/2006 | Gupte |
| 2006/0294354 A1 | 12/2006 | McCall et al. |
| 2007/0005648 A1 | 1/2007 | Armanino et al. |
| 2007/0005967 A1 | 1/2007 | Mister et al. |
| 2007/0045403 A1 | 3/2007 | Slonecker, Jr. |
| 2007/0064598 A1 | 3/2007 | Nooner et al. |
| 2007/0157016 A1 | 7/2007 | Dayan et al. |
| 2007/0288419 A1 | 12/2007 | Strassner |
| 2008/0086759 A1 | 4/2008 | Colson |
| 2008/0229352 A1 | 9/2008 | Pino et al. |
| 2008/0275951 A1 | 11/2008 | Hind et al. |
| 2009/0013194 A1 | 1/2009 | Mir et al. |
| 2009/0113110 A1 | 4/2009 | Chen et al. |
| 2009/0132645 A1 | 5/2009 | Yang et al. |
| 2009/0132953 A1 | 5/2009 | Reed, Jr. et al. |
| 2009/0136121 A1 | 5/2009 | Nakagaki et al. |
| 2009/0204613 A1 | 8/2009 | Muroi |
| 2009/0254463 A1 | 10/2009 | Tomchek et al. |
| 2010/0082384 A1 | 4/2010 | Bohrer et al. |
| 2010/0088338 A1 | 4/2010 | Pavoni, Jr. et al. |
| 2010/0114916 A1 | 5/2010 | Cooke |
| 2010/0198769 A1 | 8/2010 | Gould et al. |
| 2010/0301114 A1 | 12/2010 | Lo Faro et al. |
| 2011/0035278 A1 | 2/2011 | Fordyce, III et al. |
| 2011/0035288 A1 | 2/2011 | Clyne |
| 2011/0047072 A1 | 2/2011 | Ciurea |
| 2011/0087546 A1 | 4/2011 | Fordyce, III et al. |
| 2011/0093324 A1 | 4/2011 | Fordyce, III et al. |
| 2011/0106607 A1 | 5/2011 | Alfonso et al. |
| 2011/0164174 A1 | 7/2011 | Limberg |
| 2011/0231225 A1 | 9/2011 | Winters |
| 2011/0231305 A1 | 9/2011 | Winters |
| 2011/0264497 A1 | 10/2011 | Clyne |
| 2011/0264567 A1 | 10/2011 | Clyne |
| 2011/0313835 A1 | 12/2011 | Falkenborg et al. |
| 2011/0313900 A1 | 12/2011 | Falkenborg et al. |
| 2012/0022945 A1 | 1/2012 | Falkenborg et al. |
| 2012/0066065 A1 | 3/2012 | Switzer |
| 2012/0066107 A1 | 3/2012 | Grajetzki |
| 2012/0079537 A1 | 3/2012 | Kalidindi et al. |
| 2012/0089562 A1 | 4/2012 | Deremigio et al. |
| 2012/0185925 A1 | 7/2012 | Barkie et al. |
| 2012/0191703 A1 | 7/2012 | Huff |
| 2012/0215684 A1 | 8/2012 | Kidron |
| 2012/0239479 A1 | 9/2012 | Amaro et al. |
| 2013/0046607 A1 | 2/2013 | Granville, III |
| 2013/0066771 A1 | 3/2013 | Ciurea et al. |
| 2013/0073464 A1 | 3/2013 | Magpayo et al. |
| 2013/0103951 A1 | 4/2013 | Klevan et al. |
| 2013/0124413 A1 | 5/2013 | Itwaru |
| 2013/0151388 A1 | 6/2013 | Falkenborg et al. |
| 2013/0187926 A1 | 7/2013 | Silverstein et al. |
| 2013/0218769 A1 | 8/2013 | Pourfallah et al. |
| 2014/0046827 A1 | 2/2014 | Hochstatter et al. |
| 2014/0046842 A1 | 2/2014 | Irudayam et al. |
| 2014/0067803 A1 | 3/2014 | Kapadia et al. |
| 2014/0136104 A1 | 5/2014 | Spears et al. |
| 2014/0165133 A1 | 6/2014 | Foley et al. |
| 2014/0172576 A1 | 6/2014 | Spears et al. |
| 2014/0337331 A1 | 11/2014 | Hassanzadeh et al. |
| 2014/0365363 A1 | 12/2014 | Knudsen et al. |
| 2015/0026462 A1 | 1/2015 | Ramesh et al. |
| 2015/0127516 A1 | 5/2015 | Studnitzer et al. |
| 2015/0150023 A1 | 5/2015 | Johnson et al. |
| 2015/0150023 A1 | 5/2015 | Gould |
| 2015/0161301 A1 | 6/2015 | Begur et al. |
| 2015/0178532 A1 | 6/2015 | Brulé |
| 2015/0193243 A1 | 7/2015 | Varkhedi et al. |
| 2015/0193638 A1 | 7/2015 | Cook |
| 2015/0220649 A1 | 8/2015 | Papa et al. |
| 2015/0227931 A1 | 8/2015 | Genovez |
| 2015/0261881 A1 | 9/2015 | Wensel |
| 2015/0261948 A1 | 9/2015 | Marra et al. |
| 2015/0324900 A1 | 11/2015 | Starikova et al. |
| 2015/0363586 A1 | 12/2015 | Klevan et al. |
| 2015/0370232 A1 | 12/2015 | Kohn et al. |
| 2016/0014148 A1 | 1/2016 | Lee et al. |
| 2016/0020297 A1 | 1/2016 | Kuang et al. |
| 2016/0070971 A1 | 3/2016 | Nakashima |
| 2016/0080493 A1 | 3/2016 | Roth et al. |
| 2016/0088566 A1 | 3/2016 | Ur et al. |
| 2016/0092557 A1 | 3/2016 | Stojanovic et al. |
| 2016/0189119 A1 | 6/2016 | Bowman et al. |
| 2016/0203478 A1 | 7/2016 | Gardiner et al. |
| 2016/0294843 A1 | 10/2016 | Kaiho |
| 2016/0314403 A1 | 10/2016 | Chakraborty et al. |
| 2017/0017708 A1 | 1/2017 | Fuchs et al. |
| 2017/0085445 A1 | 3/2017 | Layman et al. |
| 2017/0091847 A1 | 3/2017 | Cama et al. |
| 2017/0109418 A1 | 4/2017 | Bartlett et al. |
| 2017/0148034 A1 | 5/2017 | Sharma et al. |
| 2017/0154067 A1 | 6/2017 | Hazlewood et al. |
| 2017/0169068 A1 | 6/2017 | Kennedy, Jr. |
| 2017/0295062 A1 | 10/2017 | Tang |
| 2017/0364584 A1 | 12/2017 | Ginter |

\* cited by examiner

LINEAGE DATA FOR DATA RECORDS

CROSS-REFERENCE TO RELATED APPLICATION

This application is a continuation of U.S. Ser. No. 17/519,776, filed Nov. 5, 2021 and entitled "Lineage Data for Data Records," which is a continuation of U.S. Ser. No. 16/036,326, filed Jul. 16, 2018, issued Nov. 9, 2021, and entitled "Lineage Data for Data Records," which is a continuation of U.S. Ser. No. 14/944,849, filed Nov. 18, 2015, issued Jul. 31, 2018, and entitled "System and Method for Automatically Capturing and Recording Lineage Data for Big Data Records," all of which are incorporated herein in their entirety for all purposes.

FIELD

The present disclosure relates to systems and methods for automatically tracking and maintaining data lineage in a big data environment.

BACKGROUND

Large data sets may exist in various sizes and organizational structures. With big data comprising data sets as large as ever, the volume of data collected incident to the increased popularity of online and electronic transactions continues to grow. For example, billions of records (also referred to as rows) and hundreds of thousands of columns worth of data may populate a single table. The large volume of data may be collected in a raw, unstructured, and undescriptive format in some instances. However, traditional relational databases may not be capable of sufficiently handling the size of the tables that big data creates.

As a result, the massive amounts of data in big data sets may be stored in numerous different data storage formats in various locations to service diverse application parameters and use case parameters. Many of the various data storage formats use a Map/Reduce framework to transform input data into output variables. An output variable may be processed through several layers of transformations before reaching the desired output format. Retracing the layers of transformations for a given variable may be difficult and time consuming. Some of the output data may contain and/or be derived from personally identifying information. Furthermore, duplicative output data may be generated, but duplicative output data may be difficult to detect and prevent.

SUMMARY

A system, method, and computer readable medium (collectively, the "system") is disclosed for automatically recording lineage data for output data. The system may read source data corresponding to a source variable and apply a transformation to the source variable to generate an output variable. The transformation may include logic, and the output variable may be configured for ingestion into a big data storage format. The system may then record lineage data of the output variable, the lineage data comprising the transformation and/or the source variable.

In various embodiments, the system may include the steps of modifying the first transformation to include a second logic, and recording a second lineage data. The second lineage data may include the first transformation and/or the source variable. The second lineage data may also be recorded after modifying the first transformation to include the second logic. The system may also receive a request to generate a requested output variable. The requested output variable may be generated from a second transformation that is the same as the first transformation. The system may thus match the first transformation to the second transformation using the lineage data. In response to matching the first transformation to the second transformation, the system may deny the request. The original output variable may be returned in response to the matching the first transformation to the second transformation. In that regard, the system may avoid duplicating the original output variable and generating the duplicative requested output variable. The lineage data may be stored in a tuple comprising the source variable and/or the output variable. The lineage data may also be stored on a distributed file system.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

DETAILED DESCRIPTION

The detailed description of various embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

As used herein, "big data" may refer to partially or fully structured, semi-structured, or unstructured data sets including hundreds of thousands of columns and records. A big data set may be compiled, for example, from a history of purchase transactions over time, from web registrations, from social media, from records of charge (ROC), from summaries of charges (SOC), from internal data, and/or from other suitable sources. Big data sets may be compiled with or without descriptive metadata such as column types, counts, percentiles, and/or other interpretive-aid data points. The big data sets may be stored in various big-data storage formats containing millions of records (i.e., rows) and numerous variables (i.e., columns) for each record.

The present disclosure provides a system, method, and computer program product for automatically tracking data lineage (i.e., the history of where an output variable came from) in a big data environment. Data lineage may include the transformation logic applied to convert source data into the desired output data. The data lineage may be stored in a centrally located repository for multiple types of big data storage formats. With data lineage information, the system can re-create both forward and backward transformation linkages for use in analytics. Lineage data may be used to detect duplicate data transformations and thereby reduce duplicative data transformations. The centralized nature of the data lineage data may enable access to data history by consulting the automatically maintained central repository, rather than relying on manual generation of history data in response to a request.

Figure 1:
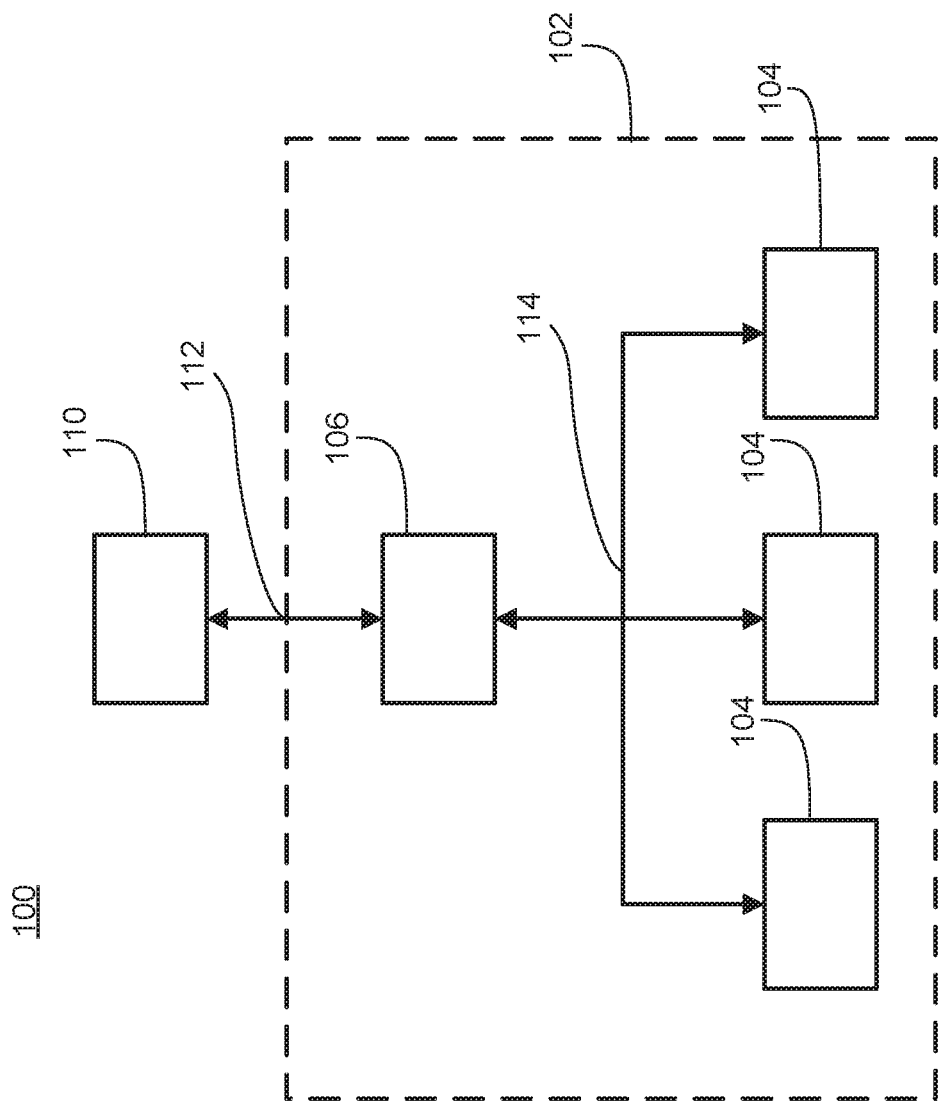
FIG. 1 illustrates an exemplary system for storing, reading, and writing big data sets, in accordance with various embodiments.

With reference to FIG. 1, a distributed file system (DFS) 100 is shown, in accordance with various embodiments. DFS 100 comprises a distributed computing cluster 102 configured for parallel processing and storage. Distributed computing cluster 102 may comprise a plurality of nodes 104 in electronic communication with each of the other nodes, as well as a control node 106. Processing tasks may be split among the nodes of distributed computing cluster 102 to improve throughput and enhance storage capacity. Distributed computing cluster may be, for example, a Hadoop® cluster configured to process and store big data sets with some of nodes 104 comprising a distributed storage system and some of nodes 104 comprising a distributed processing system. In that regard, distributed computing cluster 102 may be configured to support a Hadoop® distributed file system (HDFS) as specified by the Apache Software Foundation at http://hadoop.apache.org/docs/.

In various embodiments, nodes 104, control node 106, and client 110 may comprise any devices capable of receiving and/or processing an electronic message via network 112 and/or network 114. For example, nodes 104 may take the form of a computer or processor, or a set of computers/processors, such as a system of rack-mounted servers. However, other types of computing units or systems may be used, including laptops, notebooks, hand held computers, personal digital assistants, cellular phones, smart phones (e.g., iPhone®, BlackBerry®, Android®, etc.) tablets, wearables (e.g., smart watches and smart glasses), or any other device capable of receiving data over the network.

In various embodiments, client 110 may submit requests to control node 106. Control node 106 may distribute the tasks among nodes 104 for processing to complete the job intelligently. Control node 106 may thus limit network traffic and enhance the speed at which incoming data is processed. In that regard, client 110 may be a separate machine from distributed computing cluster 102 in electronic communication with distributed computing cluster 102 via network 112. A network may be any suitable electronic link capable of carrying communication between two or more computing devices. For example, network 112 may be local area network using TCP/IP communication or wide area network using communication over the Internet. Nodes 104 and control node 106 may similarly be in communication with one another over network 114. Network 114 may be an internal network isolated from the Internet and client 110, or, network 114 may comprise an external connection to enable direct electronic communication with client 110 and the internet.

A network may be unsecure. Thus, communication over the network may utilize data encryption. Encryption may be performed by way of any of the techniques now available in the art or which may become available—e.g., Twofish, RSA, El Gamal, Schorr signature, DSA, PGP, PKI, GPG (GnuPG), and symmetric and asymmetric cryptography systems.

In various embodiments, DFS 100 may process hundreds of thousands of records from a single data source. DFS 100 may also ingest data from hundreds of data sources. The data may be processed through data transformations to generate output variables from input variables. In that regard, input variables may be mapped to output variables by applying data transformations to the input variables and intermediate variables generated from the input values. Nodes 104 may process the data in parallel to expedite the processing. Furthermore, the transformation and intake of data as disclosed below may be carried out in memory on nodes 104. For example, in response to receiving a source data file of 100,000 records, a system with 100 nodes 104 may distribute the task of processing 1,000 records to each node 104 for batch processing. Each node 104 may then process the stream of 1,000 records while maintaining the resultant data in memory until the batch is complete for batch processing jobs. The results may be written, augmented, logged, and written to disk for subsequent retrieval. The results may be written to disks using various big data storage formats.

Figure 2:
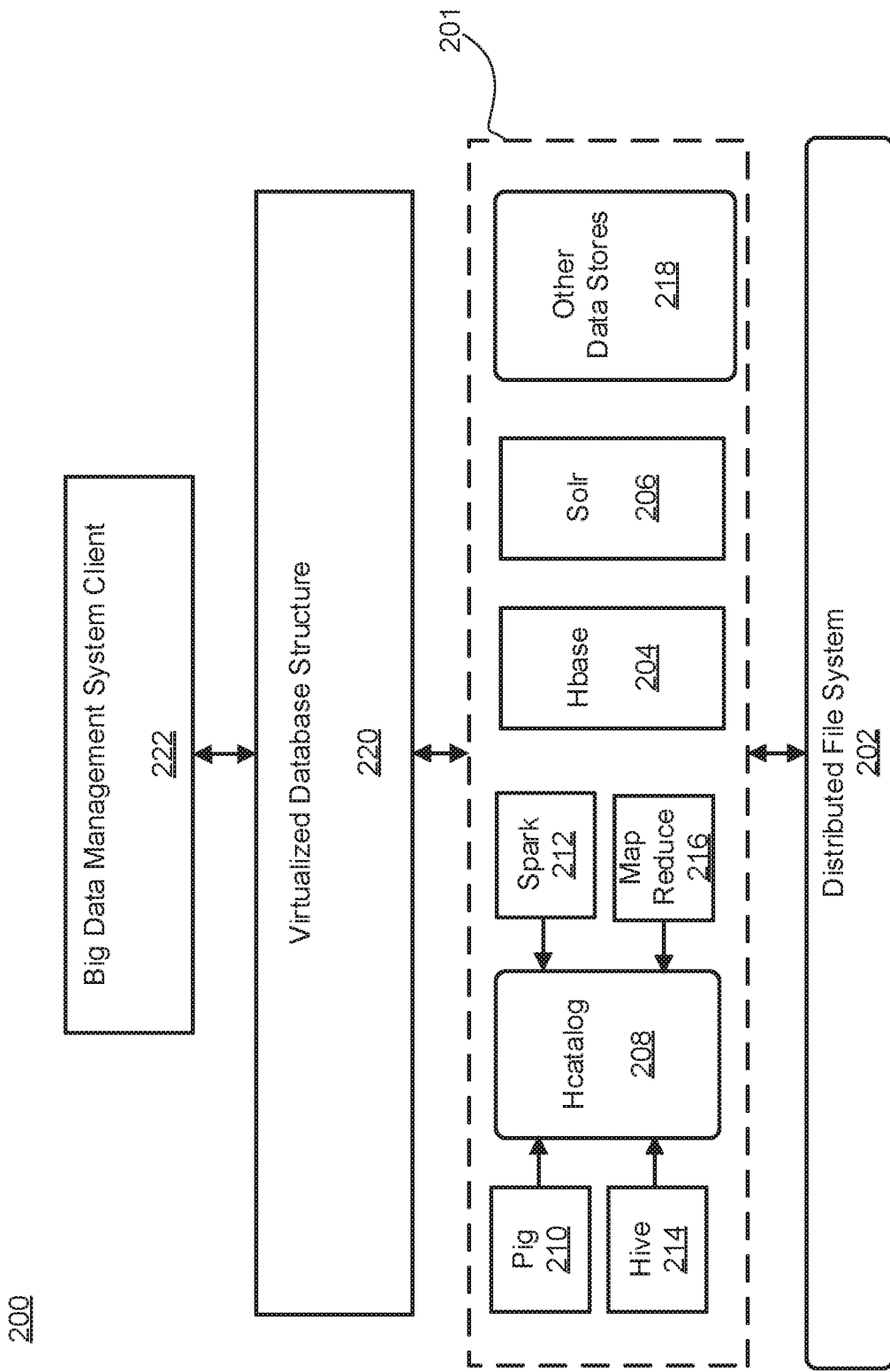
FIG. 2 illustrates an exemplary big data management system supporting a unified, virtualized interface for multiple data storage formats, in accordance with various embodiments.

With reference to FIG. 2, an exemplary architecture of a big data management system (BDMS) 200 is shown, in accordance with various embodiments. BDMS 200 may be similar to or identical to DFS 100 of FIG. 1, for example. DFS 202 may serve as the physical storage medium for the various data storage formats 201 of DFS 202. A non-relational database 204 may be maintained on DFS 202. For example, non-relational database 204 may comprise an HBase™ storage format that provides random, real time read and/or write access to data, as described and made available by the Apache Software Foundation at http://hbase.apache.org/.

In various embodiments, a search platform 206 may be maintained on DFS 202. Search platform 206 may provide distributed indexing and load balancing to support fast and reliable search results. For example, search platform 206 may comprise a Solr® search platform as described and made available by the Apache Software Foundation at http://lucene.apache.org/solr/.

In various embodiments, a data warehouse 214 such as Hive® may be maintained on DFS 202. The data warehouse 214 may support data summarization, query, and analysis of warehoused data. For example, data warehouse 214 may be a Hive® data warehouse built on Hadoop® infrastructure. A data analysis framework 210 may also be built on DFS 202 to provide data analysis tools on the distributed system. Data analysis framework 210 may include an analysis runtime environment and an interface syntax such similar to those offered in the Pig platform as described and made available by the Apache Software Foundation at https://pig.apache.org/.

In various embodiments, a cluster computing engine 212 for high-speed, large-scale data processing may also be built on DFS 202. For example, cluster computing engine 212 may comprise an Apache Spark™ computing framework running on DFS 202. DFS 202 may further support a MapReduce layer 216 for processing big data sets in a parallel, distributed manner to produce records for data storage formats 201. For example, MapReduce layer 216 may be a Hadoop® MapReduce framework distributed with the Hadoop® HDFS as specified by the Apache Software Foundation at http://hadoop.apache.org/docs/. The cluster computing engine 212 and MapReduce layer 216 may ingest data for processing, transformation, and storage in data storage formats 201 using the distributed processing and storage capabilities of DFS 202.

In various embodiments, DFS 202 may also support a table and storage management layer 208 such as, for example, an HCatalog installation. Table and storage management layer 208 may provide an interface for reading and writing data for multiple related storage formats. Continuing with the above example, an HCatalog installation may provide an interface for one or more of the interrelated technologies described above such as, for example, Hive®, Pig, Spark®, and Hadoop® MapReduce.

In various embodiments, DFS 202 may also include various other data storage formats 218. Other data storage formats 218 may have various interface languages with varying syntax to read and/or write data. In fact, each of the above disclosed storage formats may vary in query syntax and interface techniques. Virtualized database structure 220 may provide a uniform, integrated user experience by offering users a single interface point for the various different data storage formats 201 maintained on DFS 202. Virtualized database structure 220 may be a software and/or hardware layer that makes the underlying data storage formats 201 transparent to client 222 by providing variables on request. Client 222 may request and access data by requesting variables from virtualized database structure 220. Virtualized database structure 220 may then access the variables using the various interfaces of the various data storage formats 201 and return the variables to client 222.

In various embodiments, the data stored using various of the above disclosed data storage formats 201 may be stored across data storage formats 201 and accessed at a single point through virtualized database structure 220. The variables accessible through virtualized database structure 220 may be similar to a column in a table of a traditional RDBMS. That is, the variables identify data fields available in the various data storage formats 201.

In various embodiments, variables may be stored in a single one of the data storage formats 201 or replicated across numerous data storage formats 201 to support different access characteristics. Virtualized database structure 220 may comprise a catalog of the various variables available in the various data storage formats 201. The cataloged variables enable BDMS 200 to identify and locate variables stored across different data storage formats 201 on DFS 202. Variables may be stored in at least one storage format on DFS 202 and may be replicated to multiple storage formats on DFS 202. The catalog of virtualized database structure 220 may thus track the location of a variable available in multiple storage formats.

The variables may be cataloged as they are ingested and stored using data storage formats 201. The catalog may track the location of variables by identifying the storage format, the table, and/or the variable name for each variable available through virtualized database structure 220. The catalog may also include metadata describing what the variables are and where the variables came from such as data type, original source variables, timestamp, access restrictions, sensitivity of the data, and/or other descriptive metadata. For example, internal data and/or personally identifying information (PII) may be flagged as sensitive data subject to access restrictions by metadata corresponding to the variable containing the internal data and/or PII. Metadata may be copied from the data storage formats 201 or generated separately for virtualized database structure 220.

In various embodiments, virtualized database structure 220 may provide a single, unified, and virtualized data storage format that catalogues accessible variables and provides a single access point for records stored on data storage formats 201. Client 222 (which may operate using similar hardware and software to client 110 of FIG. 1) may access data stored in various data storage formats 201 via the virtualized database structure 220. In that regard, virtualized database structure 220 may be a single access point for data stored across the various data storage formats 201 on DFS 202.

In various embodiments, virtualized database structure 220 may store and maintain the catalog of variables including locations and descriptive metadata, but virtualized database structure 220 may not store the actual data contained in each variable. The data that fills the variables may be stored on DFS 202 using data storage formats 201. Virtualized database structure 220 may enable read and write access to the data stored in data storage formats 201 without a client system having knowledge of the underlying data storage formats 201.

Figure 3:
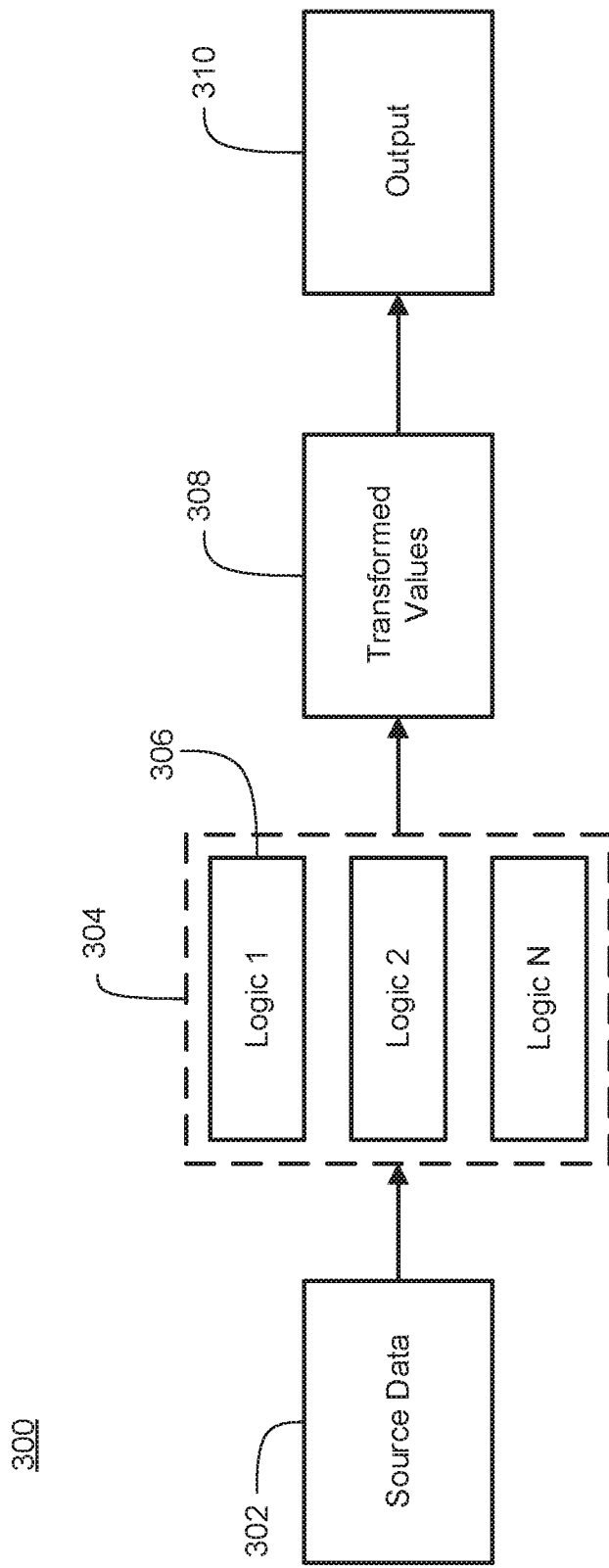
FIG. 3 illustrates an exemplary data flow from source data to output, in accordance with various embodiments.

The data stored in data storage formats 201 may be generated and/or ingested by applying a series of transformations to input data using DFS 100. The transformations may comprise a series of logical steps to alter some or all of the source data. With reference to FIG. 3, a flow chart 300 for transforming source data 302 into output 310 is shown, in accordance with various embodiments. Source data 302 may comprise a one or more raw data files such as, for example, a delimited flat file, an XML file, a database file, a table, or any other structured, semi-structured or unstructured data format. Source data 302 may include a plurality of records with each record containing data. The data in the records may be separated into fields with each field being a source variable. Source data may have transformations 304 applied in the form of logic 306.

In various embodiments, logic 306 may be a series of ordered processing steps to modify source data and generate intermediate variable values and/or output variable values. For example, logic 306 may include data formatting steps such as stripping white space and truncating numbers to a predetermined length. Logic 306 may also include evaluation steps that execute an action against the data or generate a transformed value 308 for an intermediate variable or output variable in response to evaluation of a logical statement against a value of the source variable. Transformed values 308 may be augmented and written into an output 310 such as a load file for loading into a big data storage format. For example, logical steps may identify and copy a zip code from a complete mailing address and write the zip code value into a zip code variable.

Figure 4:
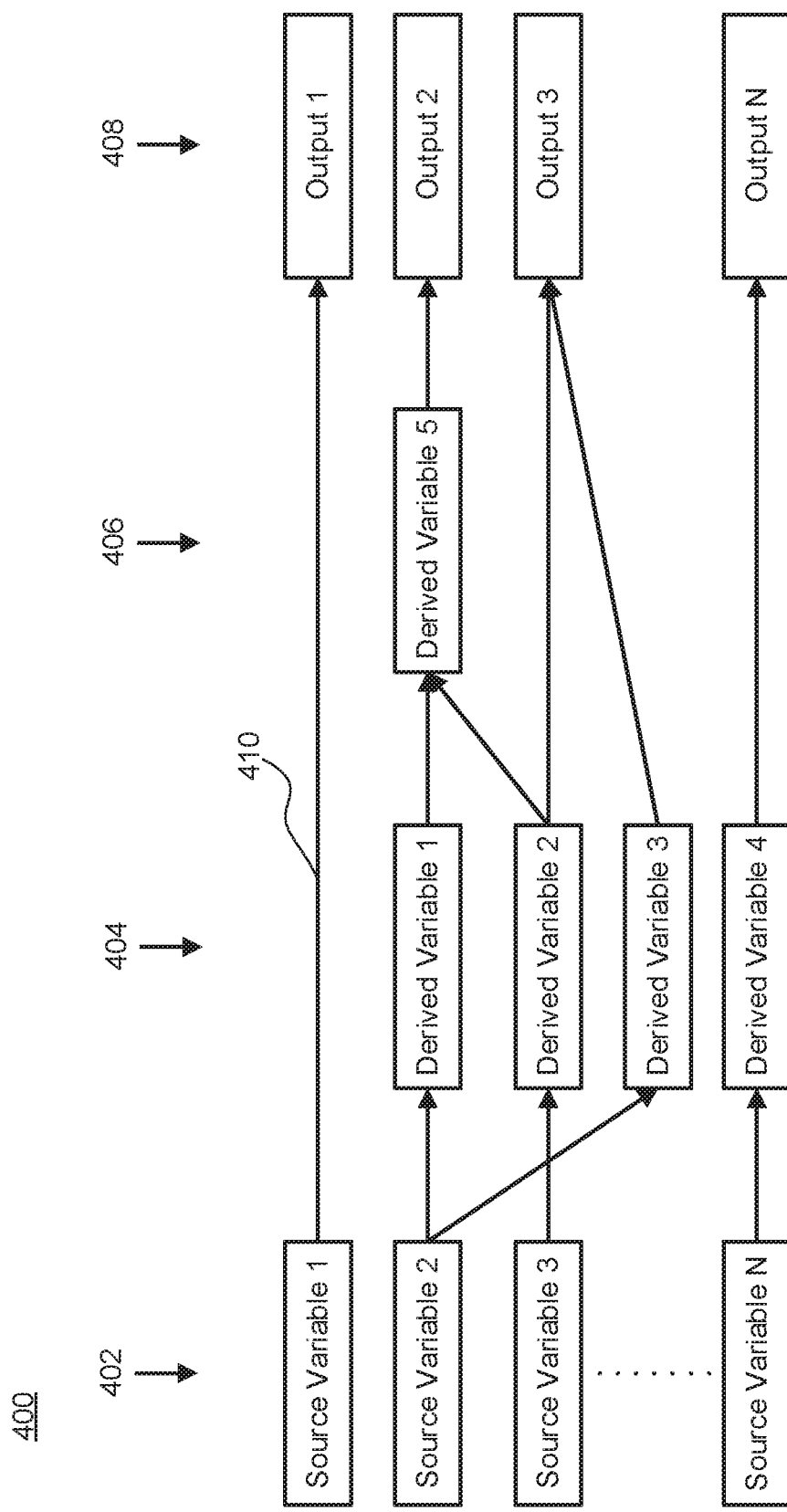
FIG. 4 illustrates an exemplary logic map for converting source data to output variables, in accordance with various embodiments.

With reference to FIG. 4, a logic map 400 is shown in a graphical form for capturing transformations applied to source data, in accordance with various embodiments. Logic map 400 as depicted is a graphical representation of the underlying lineage data for each output variable 408. Logic map 400 may also be maintained in a text format, as disclosed in greater detail below. Source variables 402 may be transformed into derived variables 404, secondary derived variables 406, and output variables 408. Output variables 408 may be written to file for storage in a big data format. The storage file may comprise records (e.g., rows in a table) each comprising one or more output variables 408 (e.g., columns of a table). For example, the storage file may be a CSV file, a JSON file, a delimited flat file, a tabular file, or another suitable file format.

In various embodiments, an exemplary logic map 400 is shown to capture the history for each output variable stored in an output file. The history for the output variables may be used to determine what transformations, source variables 402, and/or derived variables 404 are used in generating an output variable. As shown in logic map 400, source variable 1 is mapped directly to output 1 by a transformation 410. The transformation 410 may modify the data in source variable 1 or preserve the original data in source variable 1 for writing into an output file. Thus, output 1 may originate from source variable 1 and transformation 410.

In various embodiments, output variables 408 may originate from multiple source variables 402. For example, as illustrated, source variable 2 is transformed into derived variable 1, source variable 3 is transformed into derived variable 2, derived variable 1 and derived variable 2 are both transformed into derived variable 5, and derived variable 5 is transformed into output 2. Thus, the lineage data for output 2 may indicate that output 2 originates from source variable 3 and source variable 4. The linage data for output 2 may also indicate which transformations 410 were applied to the source variables 402 and which derived variables 404 at intermediate steps were used to arrive at output variable 408.

In various embodiments, the linage data may be stored in formats including tabular format, database formats, flat file formats, a collection of tuples, or any other suitable file format for capturing the lineage data for a variable. For example, lineage data may include a list of ordered pairs that capture the source variables 402, derived variables 404, secondary derived variables 406, and output variables 408. For example, a simple list of pairs corresponding to logic map 400 may appear as:

(source variable 1, output 1)
(source variable 2, derived variable 1)
(source variable 2, derived variable 3)
(source variable 3, derived variable 2)
(source variable N, derived variable 4)
(derived variable 1, derived variable 5)
(derived variable 2, derived variable 5)
(derived variable 3, output 3)
(derived variable 4, output N)
(derived variable 5, output N)

In various embodiments, the list of ordered pairs may be used to generate a logic map similar to logic map 400 without the details of the transformations applied to the data to move between the listed variables. The map may be generated regardless of the order of the tuples for processing, thus new tuples may be appended to the end of the list and tuples may be deleted or modified at any point in the list to reflect changes in the corresponding transformations applied to data without corrupting the list. Using the above list, the complete history of variables, and thus the originating source variables, for an output may be identified. More complicated tuples may be used to capture more data about a chain of transformations. For example, a tuple of (source variable 1, transformation 1, output variable 1) may capture both the relationship between source variable 1 and output variable 1 as well as the transformation applied to source variable 1 to get to output variable 1.

In various embodiments, the data lineage for the variables may be used to identify output variables that are derived from sensitive data such as PII. For example, an output variable 408 may contain a categorical age demographic (e.g., 0-18, 18-24, 25-34, 35-44, or 45 and up). The categorical age demographic information itself may not be PII; however, the categorical age demographic may be derived from a date of birth contained in a source variable 402. The date of birth source variable would be PII. Thus, the system can identify data derived from PII that may not otherwise be PII. Access to PII as well as access to data derived from PII can thus be restricted.

Figure 5:
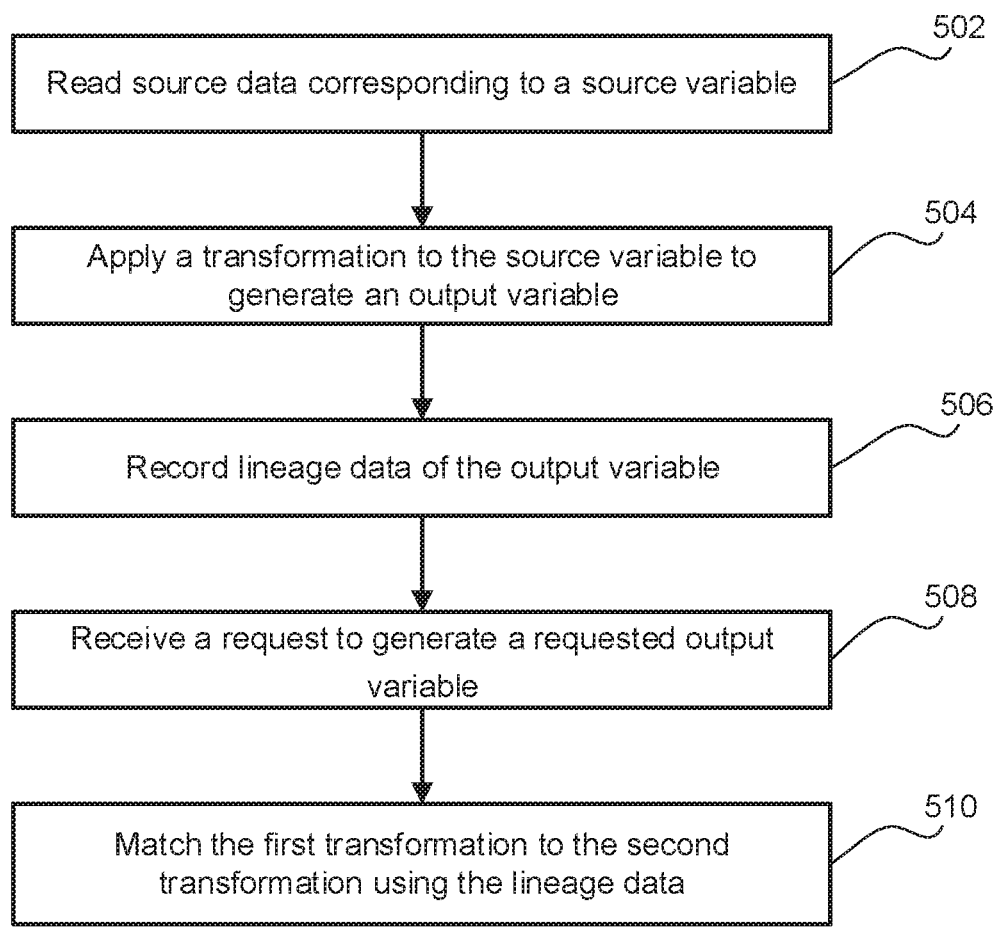
FIG. 5 illustrates an exemplary process for capturing and recording lineage data corresponding to output variables, in accordance with various embodiments.

With reference to FIG. 5, a process 500 for capturing lineage data is shown, in accordance with various embodiments. Process 500 may be carried out by a BDMS 200 and/or another system operating on DFS 100. In some embodiments, a lineage management system may be an independent software program operating on DFS 100 in parallel to BDMS 200 and integrating into a transformation system to generate data stored on BDMS 200.

In various embodiments, the process may comprise the step of reading source data corresponding to a source variable 402 (Block 502). The source data may be in a structured, unstructured, or semi-structured format and may comprise raw data for ingestion into big data management system 200. The data may be distributed across a plurality of nodes for reading and processing.

In various embodiments, the system may then apply a transformation 410 to source variable 402 to generate an output variable 408 (Block 504). The transformation may include one or more logic operations to be applied to the source variable and/or derived variables to arrive at the output variable. The output variable may be configured for ingestion into a big data storage format, for example, by writing into a load file.

In various embodiments, the system may automatically record lineage data of the output variable (Block 506). The lineage data may include a transformation, a source variable, a derived variable, and/or the output variable. As described above, the lineage data may be stored and format to facilitate recreation of a logic map and/or origination history of output variables. The lineage data may identify transformations and variables that define output variables in a deterministic manner such that two output variables having the same lineage data may be identified as duplicative output variables.

In various embodiments, the system may receive a request to generate a requested output variable (Block 508). The system may generate lineage data corresponding to the request before or after applying the transformations to input data. In that regard, lineage data may be generated prior to the execution of the actual transformations to provide analysis of the transformation. The requested output variable may be generated from a second transformation that is the same as the first transformation. That is, the second transformation may have identical or lineage data as the first transformation. The transformations may thus be identified as duplicative of one another. Lineage data may be generated and used for analysis prior to the application of transformations to source data. Duplicative transformations may thereby be reduced and/or eliminated by checking lineage data.

In various embodiments, the system may match the first transformation to the second transformation using the lineage data (Block 510). The transformations may be matched by comparing the lineage data of the first transformation to the lineage data of the second transformation. A match may be identified if the lineage data of the transformations is a strict match (i.e., the lineage data is identical). A match may also be identified if the lineage data of the transformations is similar (i.e., the lineage data is similar but has some differences). An example of similar lineage data might include lineage data that contains the same source variables 402, derived variables 404, secondary derived variables 406, and output variables 408 but may have different transformations 410 applied to the underlying data.

The systems and methods herein may track data made available in a wide variety of data storage formats (e.g., Hive®, Solr®, Hbase) having different support processing approaches (e.g., batch, real-time, process). Lineage data may be automatically captured and stored for data ingested into BDMS. The lineage data may be data storage format agnostic and may be used to identify transformations in a deterministic manner. The lineage data of the present disclosure may thus reduce the number of copies of output variables by checking lineage data for the requested output variables against the lineage data for existing output variables. In that regard, the BDMS may limit duplicative data storage and reduce duplicative data processing on a DFS. Additionally, the lineage data may provide access to origination history and thereby identify the source variables used in generating an output variable. Output variables derived wholly or partially from source variables may thereby be access controlled. Furthermore, a comprehensive may of the origination history is automatically maintained for improved response time to requests for the history of the output variables.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS® NT®, WINDOWS® 95/98/2000®, WINDOWS® XP®, WINDOWS® Vista®, WINDOWS® 7®, OS2, UNIX®, LINUX®, SOLARIS®, MacOS, etc.) as well as various conventional support software and drivers typically associated with computers.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations. Useful machines for performing the various embodiments include general purpose digital computers or similar devices.

In fact, in various embodiments, the embodiments are directed toward one or more computer systems capable of carrying out the functionality described herein. The computer system includes one or more processors, such as processor. The processor is connected to a communication infrastructure (e.g., a communications bus, cross over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Computer system also includes a main memory, such as for example random access memory (RAM), and may also include a secondary memory. The secondary memory may include, for example, a hard disk drive and/or a removable storage drive, representing a floppy disk drive, a magnetic tape drive, an optical disk drive, etc. The removable storage drive reads from and/or writes to a removable storage unit in a well-known manner. Removable storage unit represents a floppy disk, magnetic tape, optical disk, etc. which is read by and written to by removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

Computer system may also include a communications interface. Communications interface allows software and data to be transferred between computer system and external devices. Examples of communications interface may include a modem, a network interface (such as an Ethernet account), a communications port, a Personal Computer Memory Account International Association (PCMCIA) slot and account, etc. Software and data transferred via communications interface are in the form of signals which may be electronic, electromagnetic, optical or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

The terms "computer program medium" and "computer usable medium" and "computer readable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware state machine so as to perform the functions described herein will be apparent to persons skilled in the relevant art(s).

The various system components may be independently, separately or collectively suitably coupled to the network via data links which includes, for example, a connection to an Internet Service Provider (ISP) over the local loop as is typically used in connection with standard modem communication, cable modem, Dish Networks®, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

Any databases discussed herein may include relational, nonrelational, hierarchical, graphical, or object-oriented structure and/or any other database configurations including various big data products available from the Apache Software Foundation as described above. Common database products that may be used to implement the databases include DB2 by IBM® (Armonk, NY), various database products available from ORACLE® Corporation (Redwood Shores, CA), MICROSOFT® Access® or MICROSOFT® SQL Server® by MICROSOFT® Corporation (Redmond, Washington), MySQL by MySQL AB (Uppsala, Sweden), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® APPLE®ts, JAVASCRIPT, active server pages (ASP), common gateway interface scripts (CGI), extensible markup language (XML), dynamic HTML, cascading style sheets (CSS), AJAX (Asynchronous JAVASCRIPT And XML), helper applications, plug-ins, and the like. A server may include a web service that receives a request from a web server, the request including a URL and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, JAVA®, JAVASCRIPT, VBScript, Macromedia Cold Fusion, COBOL, MICROSOFT® Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "JAVA® Cryptography" by Jonathan Knudson, published by O'Reilly & Associates (1998); (3) "Cryptography & Network Security: Principles & Practice" by William Stallings, published by Prentice Hall; all of which are hereby incorporated by reference.

As will be appreciated by one of ordinary skill in the art, the system may be embodied as a customization of an existing system, an add-on product, a processing apparatus executing upgraded software, a standalone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Phrases and terms similar to "internal data" may include any data a credit issuer possesses or acquires pertaining to a particular consumer. Internal data may be gathered before, during, or after a relationship between the credit issuer and the transaction account holder (e.g., the consumer or buyer). Such data may include consumer demographic data. Consumer demographic data includes any data pertaining to a consumer. Consumer demographic data may include consumer name, address, telephone number, email address, employer and social security number. Consumer transactional data is any data pertaining to the particular transactions in which a consumer engages during any given time period. Consumer transactional data may include, for example, transaction amount, transaction time, transaction vendor/merchant, and transaction vendor/merchant location.

Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Furthermore, no element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method comprising:
   receiving, by a processor, a request to access an output variable by applying one or more data transformations to input data;
   before applying an actual data transformation to the input data, identifying, by the processor, that a match exists with a database of prior data transformations that have been applied to source variables to generate derived variables or have been applied to the derived variables to generate existing output variables and the one or more data transformations to the input data;
   identifying, by the processor, that a source variable in the matching one or more data transformations is flagged as sensitive data or that a derived variable in the matching one or more data transformations is derived from the source variable that is flagged as sensitive data; and
   processing, by the processor, the request to access the output variable subject to an access restriction in response to the identification of the source variable that is flagged as sensitive data.

2. The method of claim 1, wherein the source variable identifies a field in a record that includes the input data that is requested to be transformed to output data corresponding to the output variable.

3. The method of claim 1, wherein the database stores a logic map for the existing output variables, wherein the logic map depicts a sequence of data transformations applied to one or more of the source variables that were performed to generate the existing output variables.

4. The method of claim 1, wherein the database stores a history of one or more transformation processes performed on the source variables to produce the existing output variables such that forward and backward transformation linkages can be re-created for use in analytics.

5. The method of claim 1, wherein the one or more data transformations includes stripping white space or truncating numbers to a predetermined length.

6. The method of claim 1, wherein the database comprises a distributed file system.

7. The method of claim 1, wherein the output variable is configured for ingestion into a data storage format.

8. A computer-based system, comprising:
   a computing device comprising a processor and a memory;
   machine-readable instructions stored in the memory that, when executed by the processor, cause the computing device to at least:
      receive a request to access an output variable by applying one or more data transformations to input data;
      before applying an actual data transformation to the input data, identify that a match exists with a database of prior data transformations that have been applied to source variables to generate derived variables or have been applied to the derived variables to generate existing output variables and the one or more data transformations to the input data;
      identify that a source variable in the matching one or more data transformations is flagged as sensitive data or that a derived variable in the matching one or more data transformations is derived from the source variable that is flagged as sensitive data; and
      process the request to access the output variable subject to an access restriction in response to the identification of the source variable that is flagged as sensitive data.

9. The computer-based system of claim 8, wherein the source variable identifies a field in a record that includes the input data that is requested to be transformed to output data corresponding to the output variable.

10. The computer-based system of claim 8, wherein the database stores a logic map for the existing output variables, wherein the logic map depicts a sequence of data transformations applied to one or more of the source variables that were performed to generate the existing output variables.

11. The computer-based system of claim 8, wherein the database comprises a history of one or more transformation processes performed on the source variables to produce the existing output variables such that forward and backward transformation linkages can be re-created for use in analytics.

12. The computer-based system of claim 8, wherein the one or more data transformations includes stripping white space or truncating numbers to a predetermined length.

13. The computer-based system of claim 8, wherein the database comprises a distributed file system.

14. The computer-based system of claim 8, wherein the output variable is configured for ingestion into a data storage format.

15. A computer readable storage medium having instructions stored thereon that in response to execution by a processor of a computing device, cause the computing device to at least:
   receive a request to access an output variable by applying one or more data transformations to input data;
   before applying an actual data transformation to the input data, identify that a match exists with a database of prior data transformations that have been applied to source variables to generate derived variables or have been applied to the derived variables to generate existing output variables and the one or more data transformations to the input data;

identify that a source variable in the matching one or more data transformations is flagged as sensitive data or that a derived variable in the matching one or more data transformations is derived from the source variable that is flagged as sensitive data; and process the request to access the output variable subject to an access restriction in response to the identification of the source variable that is flagged as sensitive data.

16. The computer readable storage medium of claim 15, wherein the source variable identifies a field in a record that includes the input data that is requested to be transformed to output data corresponding to the output variable.

17. The computer readable storage medium of claim 15, wherein the database stores a logic map for the existing output variables, wherein the logic map depicts a sequence of data transformations applied to one or more of the source variables that were performed to generate the existing output variables.

18. The computer readable storage medium of claim 15, wherein the database comprises a history of one or more transformation processes performed on the source variables to produce the existing output variables such that forward and backward transformation linkages can be re-created for use in analytics.

19. The computer readable storage medium of claim 15, wherein the database comprises a distributed file system.

20. The computer readable storage medium of claim 15, wherein the output variable is configured for ingestion into a data storage format.

* * * * *